United States Patent Office
3,293,380
Patented Dec. 20, 1966

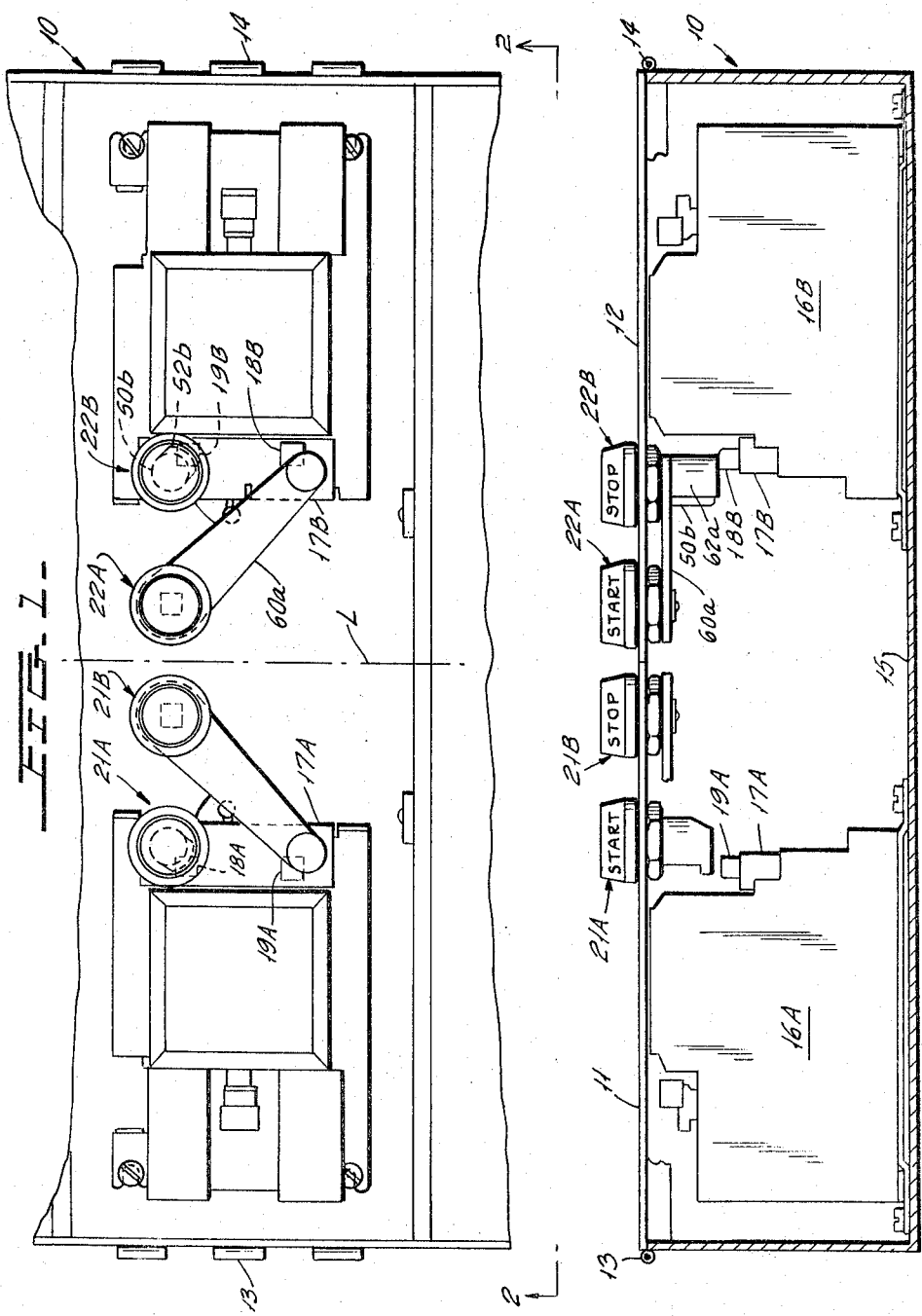

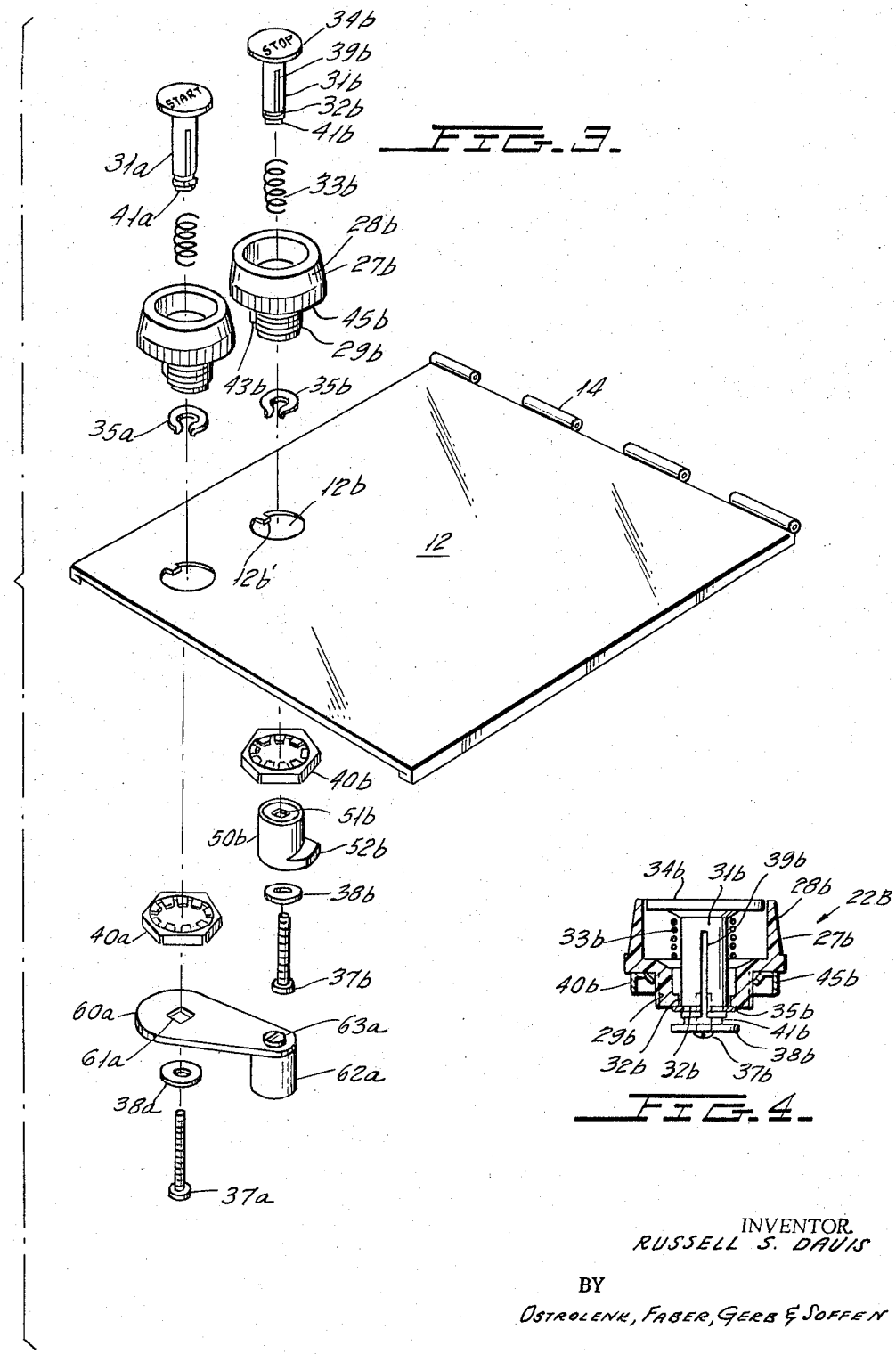

3,293,380
ENCLOSURE MOUNTED DEPRESSIBLE
PUSH BUTTON MEANS
Russell S. Davis, Detroit, Mich., assignor to I-T-E Circuit Breaker Company, Philadelphia, Pa., a corporation of Pennsylvania
Filed Nov. 23, 1964, Ser. No. 412,972
7 Claims. (Cl. 200—5)

This invention relates to enclosures for electrical devices in general and more particularly relates to novel means for arranging control buttons mounted to the enclosure cover in a logical sequence notwithstanding the fact that the controls of the devices mounted within the enclosure are not arranged in a logical sequence.

Many electrical control centers include motor starters mounted in an enclosure with the enclosure having one or more openable covers carrying push button controls for operating the motor starters. The starters are provided with their individual controls which are operated by the push buttons mounted to the enclosure cover. Because of practical considerations in mounting the motor starters within the enclosure, it often happens that the starter controls in starters positioned next to one another are arranged in an illogical sequence.

More particularly, it is often advantageous to mount two starters with the line sides thereof facing one another. In such case the Start control of one starter is next to the Stop control of the other starter and vice versa. From the view point of operating starters this is a highly undesirable arrangement in that a confusing picture is presented to the operator.

This invention provides novel means whereby the push button controls on the enclosure cover are arranged in a logical sequence. That is, with the starters having their line ends facing one another the start-stop controls of one starter are arranged in a line parallel to the line in which the stop-start controls of the other starter are disposed. However, the push buttons mounted to the cover are arranged in a single line perpendicular to the parallel lines on which the motor starter controls are disposed. Further, the cover mounted push buttons appear in a Start-Stop-Start-Stop logical sequence.

This is accomplished by providing the Start cover mounted push button for one starter and the Stop cover mounted push button for the other starter substantially in alignment with the corresponding controls of their respective starters. Further, the Stop cover mounted push button of the first starter and the Start cover mounted push button for the second starter are each provided with an offset arm, the free end of which extends in front of the corresponding controls of the respective starters.

Accordingly, a primary object of the instant invention is to provide a novel means for arranging the enclosure mounted push buttons of a control center in a logical sequence even though the most convenient electro-mechanical arrangement of the electrical devices within the enclosure presents an illogical control arrangement.

Another object of this invention is to provide a simple and inexpensive means for arranging cover mounted push buttons in a convenient sequence differing from the positions occupied by the controls of electrical devices mounted within the enclosures.

Still another object is to provide enclosure cover mounted push buttons with offset arms so that all of the cover mounted push buttons need not be in alignment with the corresponding controls of the electrical device to be operated by these respective push buttons thereby enabling a plurality of push buttons to be arranged in a logical sequence on the enclosure cover.

These as well as further objects of this invention shall become readily apparent after reading the following description of the accompanying drawings in which:

FIGURE 1 is a fragmentary front elevation of an enclosure with the cover removed revealing a pair of motor starters mounted with their line sides facing one another and showing the manner in which the enclosure cover mounted push buttons cooperate with the motor starter controls.

FIGURE 2 is an elevation view of the elements of FIGURE 1 looking in the direction of arrows 2—2 of FIGURE 1.

FIGURE 3 is an exposed perspective showing the elements mounted to the right hand cover of FIGURE 2.

FIGURE 4 is a longitudinal cross-section of one of the push button assemblies.

Now referring to the figures and more particularly to FIGURES 1 and 2. Enclosure 10 is generally of rectangular cross-section and at the front thereof is provided with a plurality of operable covers, only two of which 11, 12 are illustrated. Cover 11 is hinged at 13 to the forward end of the left wall of enclosure 10 while cover 12 is hinged at 14 to the forward end of the right wall of enclosure 10. Mounted to the back wall 15 of enclosure 10 are two electrical devices, in this case motor starters 16A, 16B each of a type fully described in the copending Cataldo et al. application Serial No. 189,915 filed April 24, 1962, entitled Electrical Device and assigned to the assignee of the instant invention. Since line and load wiring to starters 16A, 16B forms no part of this invention, and is intended to be made in a conventional manner, no description or illustration thereof is included in this application.

Starters 16A, 16B are mounted so that their respective holding interlocks 17A, 17B face one another and are equally spaced from the longitudinal axis L of enclosure 10. Each of the holding interlocks 17A, 17B is provided with a Start and a Stop push button control which is depressible towards the rear wall of enclosure 10. As seen best in FIGURE 1 Start control 18A is positioned above Stop control 19A in a line parallel to the longitudinal axis L of enclosure 10 while Stop control 19B is positioned above Start control 18B also in a line parallel to the longitudinal axis L. Thus, it is seen that the Start control 18A of motor starter 16A is positioned next to Stop control 19B of starter 16B.

It has been found that if the push buttons on covers 11, 12 are arranged in alignment with the controls of the starters 16A, 16B, a good deal of confusion results. In order to avoid confusion in this area it is desirable to have the cover mounted push buttons arranged in a logical sequence. More particularly, the Start button should be to the left of the Stop button for the respective starters.

Cover 11 is provided with two depressible push button assemblies 21A, 21B and cover 12 is provided with similar push button assemblies 22A, 22B. As seen in FIGURE 1 the push button assemblies are arranged in a line extending perpendicular to the longitudinal axis L and in a sequence 21A, 21B, 22A, 22B. As will be hereinafter shown, this is a logical sequence in that assembly 21A operates the Start control 18A of motor starter 16A while assembly 21B operates the Stop control 19A of starter 16A. Similarly, assembly 22A operates Start control 18B of starter 16B and assembly 22B operates Stop control 19B of motor starter 16B. Since the cover mounted push button assemblies are of identical construction, only the construction of push button assembly 22B will be described in detail by referring more particularly to FIGURE 4. Assembly 22B is provided with molded housing 27b having a hollow cylindrical forward section 28b and a reduced diameter rearwardly extending nipple 29b whose external surface is threaded. Cylindrical plunger 31b is mounted within housing 27b with the lower end of the former extending through guide aperture 32b at the bottom of nipple 29b. Coiled compression spring 33b, disposed within housing 27b, bears against the rear of housing portion 28b and the enlarged head 34b at the forward end of plunger 31b thereby urging plunger 31b in a forward direction. The forward movement of plunger 31b is limited by the engagement of retainer ring 35b with the rear surface of nipple 29b with retainer 35b being disposed within angular groove 36b near the rear end of plunger 31b.

Screw 37b, received by a threaded aperture in the rear surface of nipple 29b, secures retainer washer 38b in place for a reason which will hereinafter become apparent. Longitudinally extending depression 39b, in the outer surface of plunger 31a, receives a longitudinally extending keying protrusion extending inwardly from the boundary surface of aperture 32b to prevent angular movement of plunger 31b with respect to housing 27b retains push ceived by the external threads of nipple 29b retains push button assembly 22B mounted to enclosure cover 12.

The tip portion 41b at the rear end of plunger 31b is irregularly shaped to perform a keying function. More particularly, portion 41b is generally square and cooperates with a complementary aperture in a number secured to push button assembly 22B thereby preventing relative angular movement of this member with respect to push button assembly 22B, for a reason which will hereinafter become obvious.

As seen in FIGURE 3, nipple 29b is provided with a longitudinally extending radial notch 43b in the outer surface thereof. When push button assembly 22b is mounted to cover 12 nipple 29b extends through cover aperture 12b with locating tab 12b' extending into notch 43b thereby fixing the angular position of body 27b relative to cover 12. Shoulder 45b rests against the outer surface of cover 12 while nut 40b is drawn tightly against the inner surface of cover 12.

Square tip 41b of plunger 31b extends into square depression 51b at the top or forward surface of extending member 50b. Screw 37b extends through an axial bore member 50b to secure the latter to the rear or lower end of plunger 31b. While plunger 31b is in substantial alignment with stop control 19B of starter 16B the lower end of member 50b is provided with a short radial extension 52b so that a more extensive area of control 19B is engaged when plunger 31b is depressed.

The rear end of plunger 31a of button assembly 22A carries an offset arm 60a rather than an extending member 50b. Offset arm 60a is provided with a square aperture 61a which receives the square lower end 41a of plunger 31a. Screw 37a extends through washer 38a and aperture 61a into threaded engagement with plunger 31a to fixedly mount offset arm 60a to plunger 31a. The other end of offset arm 60a is provided with rearward extension 62a secured thereto by screw 63a. As seen in FIGURES 1 and 2, rearward extension 62a is positioned in general alignment with control 18B so as to operate the latter when plunger 31a is depressed.

As best seen in FIGURE 1, the extending member secured to push button assembly 21A appears as the mirror image of extending member 50b and the offset arm secured to push button assembly 21B in the mirror image of offset arm 60a.

Thus, it is seen that this invention provides a novel simplified means whereby push buttons arranged in a logical sequence on the outside of an enclosure are able to operate the controls for electrical devices mounted in the enclosure in an awkward arrangement.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a device of the class described, an enclosure having a cover operable between open and closed positions, a first and a second electrical device each disposed within said enclosure and having at one end thereof a first and a second movable control element, said control elements being spaced from said cover in its said closed position, said one ends facing one another with said control elements of said first device positioned in a first line spaced from and extending generally in the same direction as a second line passing between said control elements of said second device, an individual depressible pushbutton means individual to each of said control elements, each of said push button means being movable to operate its respective control elements, said pushbutton means mounted to said cover means and positioned in a third line transverse to said first and second lines, said first, and second and said third lines extending generally parallel to said cover in its closed position.

2. In a device of the class described an enclosure, a first and a second electrical device each disposed within said enclosure and having at one end thereof a first and a second control element, said one ends facing one another with said control elements of said first device positioned in a first line spaced from and extending generally in the same direction as a second line passing between said control elements of said second device, said enclosure including operable cover means, an individual depressible push button means individual to each of said control elements, each of said push button means when depressed operating its respective control element, said push button means mounted to said cover means and positioned in a third line transverse to said first and second lines in which a fourth line generaly parallel to said third line extends between said first control element of said first device and said second control element of said second device, said pushbutton means individual to said second control element of said first device being positioned between said pushbutton means individual to said first control elements.

3. A device as set forth in claim 2 in which a fifth line generally parallel to said third line extends between said second control element of said first device and said first control element of said second device, said pushbutton means individual to said first control element of said second device being positioned between said pushbutton means individual to said second control elements.

4. A device as set forth in claim 3 in which each of said pushbutton means includes a plunger depressible along its axis, said plungers of said pushbutton means individual to said first control element of said first device and said second control element of said second device positioned in substantial alignment with the respective ones of said control elements operated thereby.

5. A device as set forth in claim 4 in which there is an individual radial offset arm secured at one of its ends to each of said plungers of said pushbutton means individual to said second control element of said first device and said first control element of said second device, the other ends of said offset arms positioned in substantial alignment with the respective ones of those control elements operated thereby.

6. A device as set forth in claim 5 including keying means maintaining the pushbutton means individual to said second control element of said first device and said first control element of said second device in predetermined angular relationship with respect to said cover means, and additional keying means maintaining said arms in fixed angular relationship with respect to the plungers to which said arms are mounted.

7. A device as set forth in claim 6 in which said cover means includes a first and a second part mounted to respective first and second hinge means disposed on opposite sides of said enclosure, said hinge means defining axes extending generally in the direction of said first line.

References Cited by the Examiner
UNITED STATES PATENTS

| | | | |
|---|---|---|---|
| 3,180,962 | 4/1965 | Driscoll | 200—168 |
| 3,182,160 | 5/1965 | Zavertnik et al. | 200—172 X |
| 3,193,607 | 7/1965 | Anderson | 200—5 X |

ROBERT K. SCHAEFER, *Primary Examiner.*

J. R. SCOTT, *Assistant Examiner.*